United States Patent
Komamaki et al.

(10) Patent No.: US 8,059,967 B2
(45) Date of Patent: Nov. 15, 2011

(54) OPTICAL PULSE GENERATOR AND OPTICAL PULSE TESTER

(75) Inventors: Moritoshi Komamaki, Musashino (JP); Yoshinori Matsumoto, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1071 days.

(21) Appl. No.: 11/862,250

(22) Filed: Sep. 27, 2007

(65) Prior Publication Data

US 2008/0080855 A1 Apr. 3, 2008

(30) Foreign Application Priority Data

Sep. 29, 2006 (JP) ................. 2006-267992
Sep. 29, 2006 (JP) ................. 2006-267993
Jul. 9, 2007 (JP) ................. 2007-179505

(51) Int. Cl.
*H04B 10/04* (2006.01)
(52) U.S. Cl. ............ 398/182; 398/16; 398/201
(58) Field of Classification Search ........... 398/16, 398/182–201
See application file for complete search history.

(56) References Cited

U.S. PATENT DOCUMENTS

| | | | | |
|---|---|---|---|---|
| 4,736,380 A | * | 4/1988 | Agoston | 372/38.07 |
| 5,987,045 A | * | 11/1999 | Albares et al. | 372/38.02 |
| 7,091,462 B2 | * | 8/2006 | Wilson et al. | 250/205 |
| 2005/0057468 A1 | * | 3/2005 | Yamamoto et al. | 345/87 |
| 2005/0286909 A1 | * | 12/2005 | Kish et al. | 398/196 |

FOREIGN PATENT DOCUMENTS

| | | |
|---|---|---|
| JP | 6-201482 A | 7/1994 |
| JP | 11042815 A | 2/1999 |
| JP | 2000-283884 A | 10/2000 |
| JP | 2001281102 A | 10/2001 |

OTHER PUBLICATIONS

Japanese Office Action corresponding to Japanese Patent Application No. 2006-267993, mailed May 17, 2011.

* cited by examiner

*Primary Examiner* — Dzung Tran
(74) *Attorney, Agent, or Firm* — Sughrue Mion, PLLC

(57) ABSTRACT

An optical pulse generator includes a light emitting element that emits an optical pulse, and a driver. The driver is configured to apply a pulse driving current to the light emitting element to allow the light emitting element to emit an optical pulse. The driver is also configured to apply a preliminary driving current to the light emitting element prior to starting the application of the pulse driving current. The preliminary driving current is lower than a minimum level that needs to cause a stimulated emission of light.

12 Claims, 13 Drawing Sheets

OPTICAL PULSE GENERATOR AND OPTICAL PULSE TESTER

BACKGROUND OF THE INVENTION

1. Field of the Invention

The present invention generally relates to an optical pulse generator and an optical pulse tester that is operated using the optical pulse generator.

Priorities are claimed on Japanese Patent Applications No. 2006-267992, filed Sep. 29, 2006, No. 2006-267993, filed Sep. 29, 2006, and No. 2007-179505, filed Jul. 9, 2007, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

An optical pulse tester is a device that is configured to test the performance of an optical fiber such as transmission loss and point of failure. The optical pulse tester is configured to cause an optical pulse to be incident into a test target, for example, an optical fiber, and to detect backscattered light that has been given by the optical fiber, thereby testing the performance of the optical fiber. The optical pulse tester may also be called to as "optical fiber tester" or "optical time domain reflect meter". The optical pulse tester may typically use an optical pulse generator. The optical pulse generator may include a laser diode and a driver circuit. The laser diode is driven by the driver circuit so that the laser diode emits optical pulses.

Japanese Unexamined Patent Application, First Publication, No. 2000-283884 discloses a conventional optical pulse tester and an optical pulse generator used for allowing the optical pulse tester to perform the test.

Japanese Unexamined Patent Application, First Publication, No. 6-201482 discloses another conventional optical pulse tester and an optical pulse generator used for allowing the optical pulse tester to perform the test.

One of the most important performance factors for the optical pulse tester is the spatial resolution thereof. The spatial resolution is the ability to distinguish the scattering point on the optical fiber with reference to the optical pulse generator. In other words, the spatial resolution is the ability to distinguish the distance of the scattering point from the optical pulse generator over the optical fiber. In general, the spatial resolution is increased by increasing the abruptness of the rising and/or falling edges of a pulse and also by narrowing the pulse width.

The conventional optical pulse generator has a closed-loop connection of a switching transistor, a voltage generator, and a laser diode. The switching transistor is driven to be switched ON and OFF by a pulse control signal. In a case, the switching transistor may be a high speed switching transistor that has high speed switching performance. The high speed switching transistor or the peaking circuit can be used to increase the abruptness of the rising and/or falling edges of an optical pulse and/or to narrow the optical pulse width. However, further increase in the abruptness of the rising and/or falling edges of an optical pulse and/or further narrowing of the optical pulse width are necessary for advanced optical pulse generators.

The conventional optical pulse generator generates optical pulses that have a low peak to peak value of optical pulses, resulting in narrow dynamic range of the optical pulses.

In view of the above, it will be apparent to those skilled in the art from this disclosure that there exists a need for an improved an optical pulse generator and an improved optical pulse tester that is operated using the improved optical pulse generator. This invention addresses this need in the art as well as other needs, which will become apparent to those skilled in the art from this disclosure.

SUMMARY OF THE INVENTION

Accordingly, it is a primary object of the present invention to provide an improved optical pulse generator.

It is another object of the present invention to provide an improved optical pulse tester that uses the improved optical pulse generator.

It is a further object of the present invention to provide an optical pulse generator that generates an optical pulse with reduced pulse width.

It is a still further object of the present invention to provide an optical pulse tester that uses the optical pulse generator that generates an optical pulse with reduced pulse width.

It is yet a further object of the present invention to provide an optical pulse generator that generates an optical pulse with increased abruptness of the rising and/or falling edges.

It is an additional object of the present invention to provide an optical pulse tester that uses the optical pulse generator that generates an optical pulse with increased abruptness of the rising and/or falling edges.

It is another object of the present invention to provide an optical pulse generator that generates an optical pulse with increased dynamic range.

It is still another object of the present invention to provide an optical pulse tester that uses the optical pulse generator that generates an optical pulse with increased dynamic range.

It is yet another object of the present invention to provide an optical pulse tester that has increased spatial resolution.

In accordance with a first aspect of the present invention, an optical pulse generator may include, but is not limited to, a light emitting element that emits an optical pulse, and a driver. The driver is configured to apply a pulse driving current to the light emitting element to allow the light emitting element to emit an optical pulse. The driver is also configured to apply a preliminary driving current to the light emitting element in a period of time between before and after starting the application of the pulse driving current, and wherein the preliminary driving current is lower than a minimum level that needs to cause a stimulated emission of light.

In some cases, the driver may further include, but is not limited to, a driving signal generator, a driving unit, a preliminary signal generator, and a preliminary driving unit. The driving signal generator is configured to generate a driving signal. The driving unit is configured to receive the driving signal from the driving signal generator. The driving unit is also configured to apply the pulse driving current to the light emitting element based on the driving signal. The preliminary signal generator is configured to generate a preliminary driving signal. The preliminary driving unit is configured to receive the preliminary driving signal from the preliminary signal generator. The preliminary driving unit is also configured to apply the preliminary driving current to the light emitting element based on the preliminary driving signal.

In some cases, the driver may further include, but is not limited to, a driving signal generator, a preliminary signal generator, and a driving unit. The driving signal generator is configured to generate a driving signal. The preliminary signal generator is configured to generate a preliminary driving signal. The driving unit is configured to receive the driving signal from the driving signal generator. The driving unit is also configured to receive the preliminary driving signal from the preliminary signal generator. The driving unit is also configured to apply the pulse driving current to the light emitting element based on the driving signal. The driving unit is also configured to apply the preliminary driving current to the light emitting element based on the preliminary driving signal.

In accordance with a second aspect of the present invention, an optical pulse tester supplies an optical pulse to an optical fiber. The optical pulse tester receives a return light from the optical fiber. The optical pulse tester determines the properties of the optical fiber based on the return light. The optical pulse tester may include, but is not limited to, an optical pulse generator in accordance with the first aspect of the present invention.

In accordance with the first and second aspects of the present invention, the driver is configured to apply a pulse driving current to the light emitting element to allow the light emitting element to emit an optical pulse. The driver is also configured to apply a preliminary driving current to the light emitting element in a period of time between before and after starting the application of the pulse driving current, wherein the preliminary driving current is lower than a minimum level that needs to cause a stimulated emission of light. Application of the preliminary driving current to the light emitting element reduces the differential resistance of the light emitting element. The pulse driving current is applied to the light emitting element which is being reduced in its differential resistance, thereby narrowing the pulse width of the optical pulse and increasing the abruptness of the rising edge of the optical pulse. Narrowing the pulse width of an optical pulse which is supplied to a test target such as an optical fiber can improve the spatial resolution of the optical pulse tester. Increasing the abruptness of the rising edge of an optical pulse which is supplied to a test target such as an optical fiber can also improve the spatial resolution of the optical pulse tester.

In accordance with a third aspect of the present invention, an optical pulse generator may include, but is not limited to, a light emitting element, and a driver. The light emitting element emits an optical pulse. The driver may include, but is not limited to, a forward bias circuit and a reverse bias circuit. The reverse bias circuit is configured to apply a reverse bias voltage to the light emitting element. The forward bias circuit is configured to apply a first forward bias voltage to the light emitting element that is being applied with the reverse bias voltage so as to apply a driving current to the light emitting element.

In some cases, the light emitting element may be a laser diode having an anode and a cathode. The reverse bias circuit may include, but is not limited to, a bias diode, a resistance, and a voltage supply. The bias diode has a cathode that is connected to the anode of the laser diode. The diode also has an anode that is connected to the cathode of the laser diode. The resistance is connected to the bias diode. The voltage supply applies a second forward bias voltage to the bias diode through the resistance.

In some cases, the light emitting element may be a laser diode having an anode and a cathode. The reverse bias circuit may include, but is not limited to, a bias diode having a cathode that is connected to the anode of the laser diode. The diode may have an anode that is connected to the cathode of the laser diode. The variable voltage supply applies the third forward bias voltage to the bias diode. The variable voltage supply varies the third forward bias voltage.

In some cases, the reverse bias circuit may include, but is not limited to, a switch that selectively discontinues application of the reverse bias voltage to the light emitting element.

In accordance with a fourth aspect of the present invention, an optical pulse tester supplies an optical pulse to an optical fiber. The optical pulse tester receives a return light from the optical fiber. The optical pulse tester determines the properties of the optical fiber based on the return light. The optical pulse tester may include, but is not limited to, the optical pulse generator in accordance with the third aspect of the present invention.

In accordance with the third and fourth aspects of the present invention, the reverse bias circuit is configured to apply a reverse bias voltage to the light emitting element. The forward bias circuit is configured to apply a first forward bias voltage to the light emitting element that is being applied with the reverse bias voltage by the reverse bias circuit so as to apply a driving current to the light emitting element. Namely, the forward bias voltage is applied to the light emitting element that is being applied with the reverse bias voltage, thereby increasing the rising and/or falling edges of an optical pulse, narrowing the pulse width of the optical pulse as well as increasing the height of the optical pulse. Increasing the height of the optical pulse increases the dynamic range of the optical pulse. Narrowing the pulse width of an optical pulse which is supplied to a test target such as an optical fiber can improve the spatial resolution of the optical pulse tester. Increasing the abruptness of the rising edge of an optical pulse which is supplied to a test target such as an optical fiber can also improve the spatial resolution of the optical pulse tester. Increasing the dynamic range of the optical pulse can improve the spatial resolution of the optical pulse tester.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
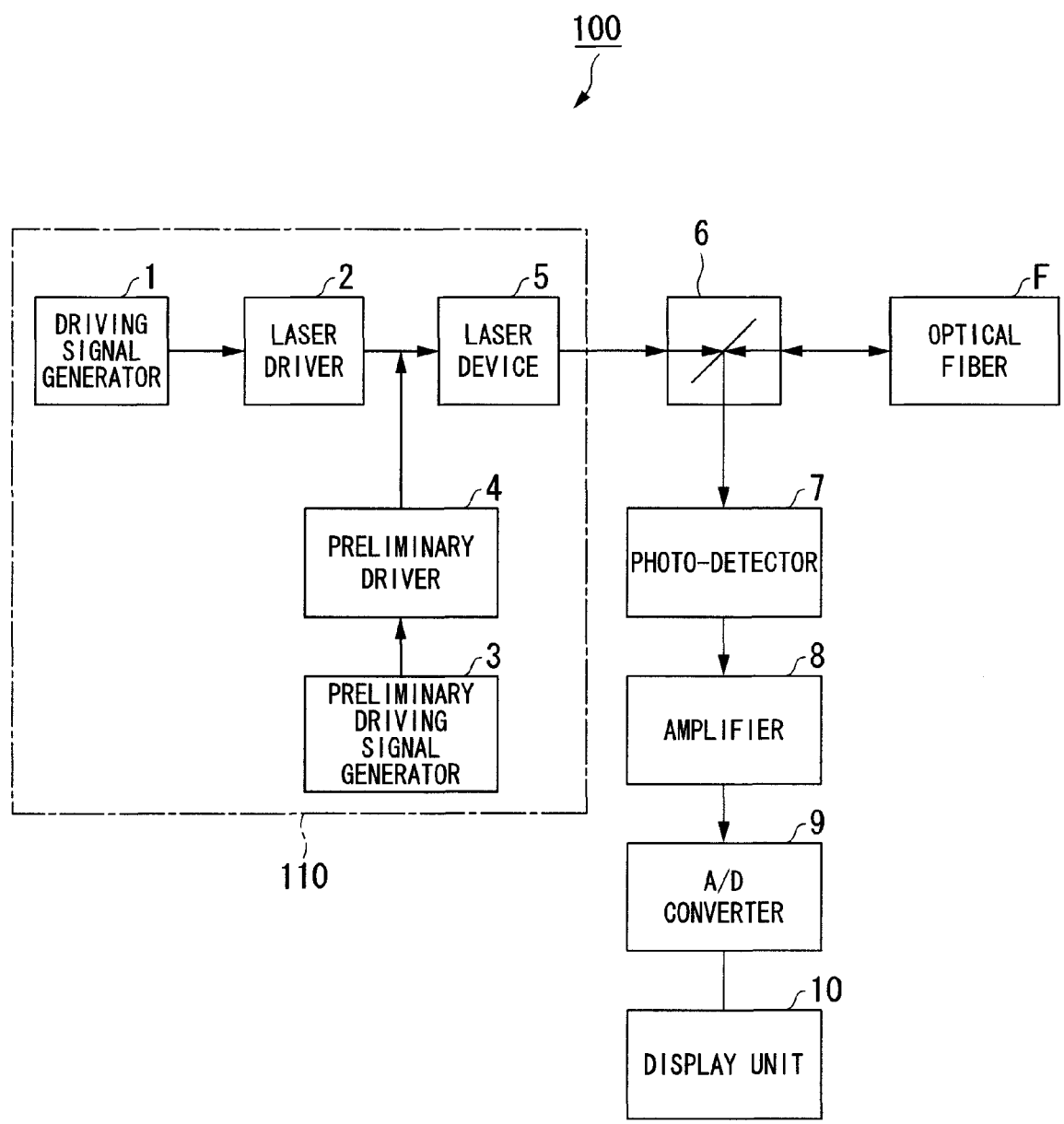
FIG. 1 is a block diagram illustrating the configuration of an optical pulse tester in accordance with a first embodiment of the present invention.

FIG. 1 is a block diagram illustrating the configuration of an optical pulse tester in accordance with a first embodiment of the present invention. An optical pulse tester 100 is, in use, optically coupled to an optical fiber F. The optical pulse tester 100 may typically include, but is not limited to, an optical pulse generator 110, a directional coupler 6, a photo-detector 7, an amplifier 8, an A/D converter 9, and a display unit 10. The optical pulse generator 110 may further include, but is not limited to, a driving signal generator 1, a laser driver 2, a preliminary driving signal generator 3, a preliminary driver 4, and a laser device 5. In other words, the optical pulse generator 110 may further include, but is not limited to, a laser driving system and the laser device 5, where the driving system may include, but is not limited to, the driving signal generator 1, the laser driver 2, the preliminary driving signal generator 3, and the preliminary driver 4.

The driving signal generator 1 may typically be configured to generate a driving signal that designates the timing of emission of an optical pulse. The driving signal generator 1 may be connected to the laser driver 2 so as to supply the driving signal to the laser driver 2. The driving signal generator 1 may typically be realized by, but is not limited to, a pulse generating circuit that generates a pulse signal.

The laser driver 2 may receive the pulse signal from the driving signal generator 1. The laser driver 2 may be connected to the laser device 5. The laser driver 2 may typically be configured to drive the laser device 5 ON and OFF based on the driving signal.

The preliminary driving signal generator 3 may typically be configured to generate a preliminary driving signal by synchronizing with the generation of the driving signal by the driving signal generator 1. The preliminary driving signal generator 3 may be connected to the preliminary driver 4 so as to supply the preliminary driving signal to the preliminary driver 4. The preliminary driving signal generator 3 may typically be realized by, but is not limited to, a preliminary pulse generating circuit that generates a preliminary pulse signal. The preliminary pulse signal that is generated by the preliminary driving signal generator 3 may have a predetermined difference in time from the pulse signal that is generated by the driving signal generator 1.

The preliminary laser driver 4 may receive the preliminary pulse signal from the preliminary driving signal generator 3. The preliminary laser driver 4 may be connected to the laser device 5. The preliminary laser driver 4 may typically be configured to drive the laser device 5 ON and OFF based on the preliminary driving signal. The laser driver 2 and the preliminary laser driver 4 may cooperate with each other to drive the laser device 5.

The laser device 5 may typically be realized by, but is not limited to, a laser diode. The laser diode may typically be configured to receive injections of driving currents from the laser driver 2 and the preliminary laser driver 4 and to generate an optical pulse with a short pulse width upon the driving signal and the preliminary driving signal. The laser device 5 may typically be configured to emit the optical pulse toward the directional coupler 6.

Figure 2:
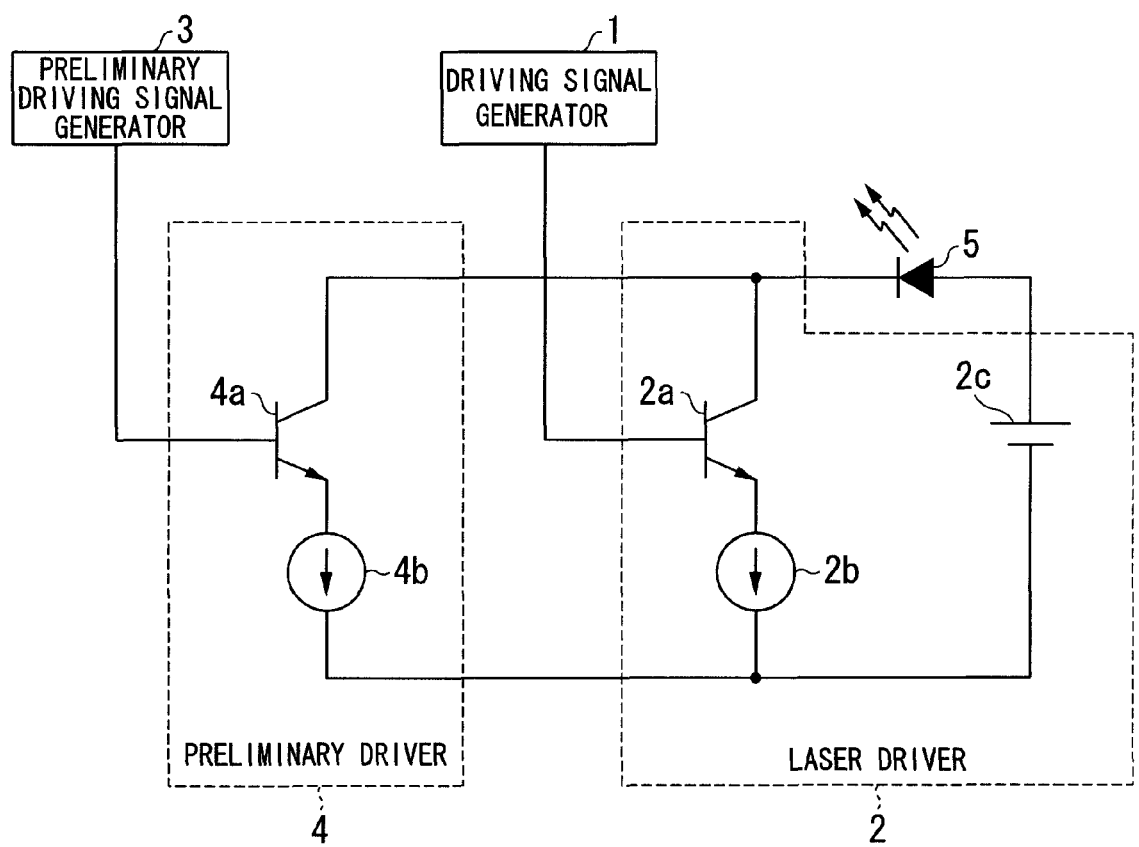
FIG. 2 is a circuit diagram illustrating a circuit configuration of an optical pulse generator in the optical pulse tester of FIG. 1.

FIG. 2 is a circuit diagram illustrating the circuit configuration of the laser driver 2, the preliminary laser driver 4, and the laser device 5 in the optical pulse tester of FIG. 1. The laser driver 2 may typically include, but is not limited to, a driving transistor 2a, a constant current source 2b, and a direct current source 2c. The preliminary laser driver 4 may typically include, but is not limited to, a driving transistor 4a, and a constant current source 4b.

The driving transistor 2a is an emitter-grounded NPN transistor. The driving transistor 2a has a collector as an output that is connected to a cathode of the laser device 5. An anode of the laser device 5 is connected to a positive electrode of the direct current source 2c. The driving transistor 2a also has a base as an input that is connected to the driving signal generator 1 so that the base receives the driving signal from the driving signal generator 1. The driving transistor 2a also has an emitter that is connected to the constant current source 2b.

The constant current source 2b is provided to keep the driving transistor 2a in having a first constant emitter current and a first constant collector current. The first constant collector current may be almost equal to the first constant emitter current. The constant current source 2b is configured to generate the first constant emitter and collector currents that are enough high to allow the laser device 5 to emit light.

As described above, the direct current source 2c has the positive electrode that is connected to the anode of the laser device 5. The direct current source 2c has a negative electrode that is connected to the constant current source 2b. The direct current source 2c is configured to apply a forward bias to the laser driver 2, to the output of the driving transistor 2a, and to the laser device 5.

The driving transistor 4a is an emitter-grounded NPN transistor. The driving transistor 4a has a collector as an output that is connected to a cathode of the laser device 5. The driving transistor 4a also has a base as an input that is connected to the preliminary driving signal generator 3 so that the base receives the preliminary driving signal from the preliminary driving signal generator 3. The driving transistor 4a also has an emitter that is connected to the constant current source 4b.

The constant current source 4b is provided to keep the driving transistor 4a in having a second constant emitter current and a second constant collector current. The first constant collector current may be almost equal to the second constant emitter current. The second constant collector and emitter currents are set independently from the first constant collector and emitter currents. As described above, the first constant collector and emitter currents are set higher than the minimum level that needs to allow the laser device 5 to emit light. In contrast, the second constant collector and emitter currents are set lower than the minimum level that needs to allow the laser device 5 to emit light. In some cases, the second constant collector and emitter currents are set lower slightly than a threshold value that needs for transition of the laser device 5 from the OFF-state to the ON-state.

With reference back to FIG. 1, the optical coupler 6 is optically coupled to the laser device 5 to receive an incidence of an optical pulse signal that has been emitted from the laser device 5. As described above, the optical coupler 6 is also optically coupled to the optical fiber F. The optical coupler 6 is also coupled to the photo-detector 7. The optical coupler 6 is configured to transmit the incident optical pulse to the optical fiber F. The optical coupler 6 also receives an incident of a return light from the optical fiber F. The optical coupler 6 is configured to reflect the return light toward the photo-detector 7. In other words, the optical coupler 6 is configured to emit the return light toward the photo-detector 7.

The photo-detector 7 is configured to perform a photoelectric conversion that converts the return light into a light-receiving electric signal. The photo-detector 7 is electrically coupled to the amplifier 8 so that the photo-detector 7 supplies the light-receiving electric signal to the photo-detector 7.

The amplifier 8 receives the light-receiving electric signal from the photo-detector 7. The amplifier 8 is configured to amplify the light-receiving electric signal by a predetermined amplification degree, thereby generating an amplified electric signal. The amplifier 8 is electrically coupled to the A/D converter 9 so that the amplifier 8 supplies the amplified electric signal to the A/D converter 9. The amplified electric signal is an analog signal.

The A/D converter 9 receives the amplified electric signal as the analog signal from the amplifier 8. The A/D converter 9 is configured to perform sampling of the amplified electric signal as the analog signal at a predetermined time interval, thereby causing analog-to-digital conversion from the amplified electric signal as the analog signal to light receiving data as a digital signal. The light receiving data as the digital signal is a set of time series data that show the time-variation in the intensity of the return light. The A/D converter 9 is electrically coupled to the display unit 10 so that the A/D converter 9 supplies the light receiving data to the display unit 10.

The display unit 10 receives the time-series of light receiving data from the A/D converter 9. The display unit 10 is configured to time-sequentially apply the predetermined signal processing to the data, thereby performing time-sequential conversion of the data into display data. The display unit 10 is configured to display a measurement screen based on the display data. The measurement screen shows the distances of the optical fiber F from the reference point of the optical pulse tester 100, wherein the distances were converted from the time-variations in the intensity of the return light.

Figure 3:
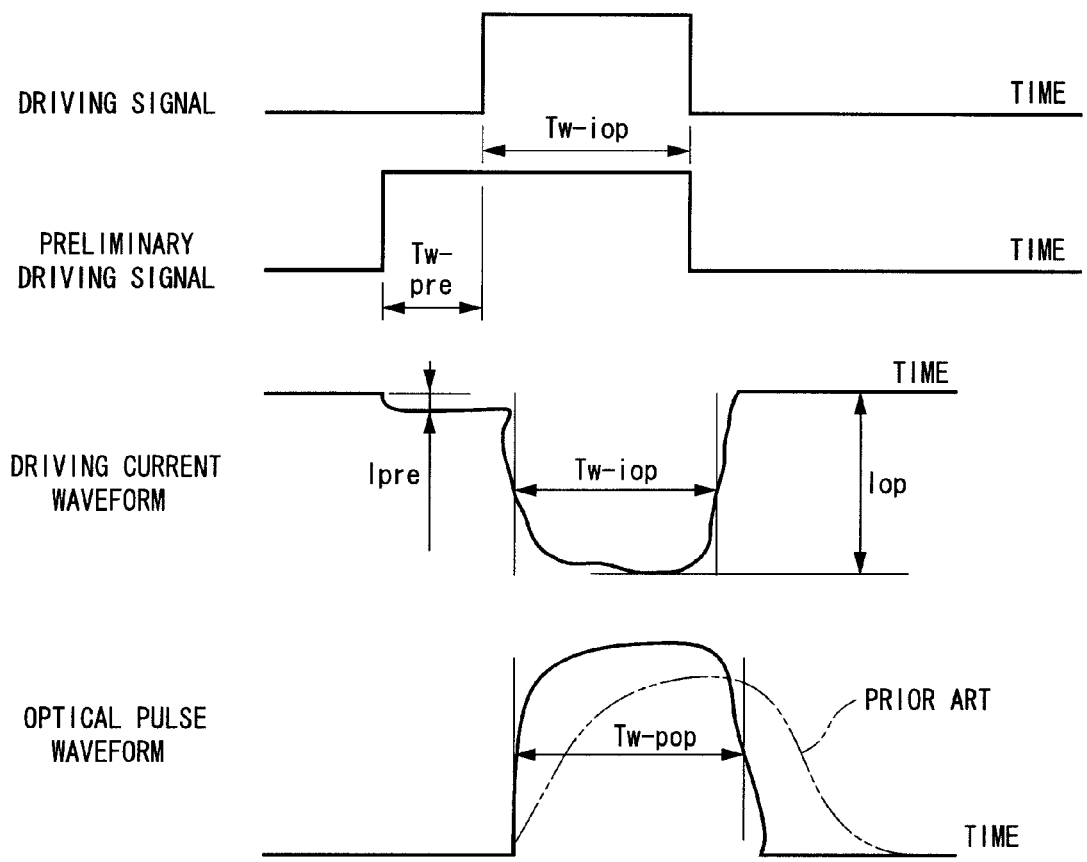
FIG. 3 is a diagram illustrating a driving signal waveform, a preliminary driving signal waveform, a driving current waveform, and an optical pulse waveform of an optical pulse generator shown in FIG. 1.

The following descriptions will involve operations of the above-described optical pulse tester 100 and operations of the above-described optical pulse generator 110. FIG. 3 is a diagram illustrating a driving signal waveform, a preliminary driving signal waveform, a driving current waveform, and an optical pulse waveform of the optical pulse generator 110 shown in FIG. 1. The driving signal generator 1 generates a driving signal, so that the driving signal generator 1 supplies the driving signal to the laser driver 2. For example, the driving signal generator 1 supplies the driving signal to the base of the driving transistor 4a. The driving signal is a pulse signal that has a predetermined pulse width Tw-iop.

The preliminary driving signal generator 3 generates a preliminary driving signal, so that the preliminary driving signal generator 3 supplies the preliminary driving signal to the preliminary laser driver 4. For example, the preliminary driving signal generator 3 supplies the preliminary driving signal to the base of the driving transistor 4a. The preliminary driving signal is a different pulse signal from the driving signal. The preliminary driving signal has a pulse width that is wider by Tw-pre than the pulse width Tw-iop of the driving signal. The driving signal has the same timing of its falling edge as the preliminary driving signal. The driving signal has an earlier timing of its rising edge by Tw-pre than the driving signal.

The driving transistor 2a of the laser driver 2 is placed in the OFF state as the driving signal is in the low level (L-level). The driving transistor 2a is placed in the ON state as the driving signal is in the high level (H-level). The driving transistor 2a in the OFF state does not supply the driving current to the laser device 5. The driving transistor 2a in the ON state supplies the driving current to the laser device 5.

The driving transistor 4a of the preliminary laser driver 4 is placed in the ON state as the preliminary driving signal is in the high level (H-level). The driving transistor 4a is placed in the OFF state as the preliminary driving signal is in the low level (L-level). The driving transistor 4a in the OFF state does not supply the preliminary driving current to the laser device 5. The driving transistor 4a in the ON state supplies the preliminary driving current to the laser device 5. The driving transistor 4a is switched from OFF to ON at the timing earlier by Tw-pre than the timing when the driving transistor 2a is switched from OFF to ON.

The driving current is supplied to the laser device 5 from the direct current source 2c. The waveform of the driving current is shown in FIG. 3. The laser device 5 is supplied with not only the emission injection current Iop but also a preliminary injection current Ipre. The preliminary injection current Ipre is applied to the laser device 5 before the emission injection current Iop is applied to the laser device 5. The emission injection current Iop is a pulse current that has a pulse width Tw-iop and a pulse height Iop. The pulse width Tw-iop of the emission injection current Iop corresponds to the pulse width Tw-iop of the driving signal. The pulse height Iop of the emission injection current Iop is higher than the height of the preliminary injection current Ipre. The pulse height Iop of the emission injection current Iop is so high as to cause the laser device 5 to exhibit stimulated emission when the emission injection current Iop is applied to the laser device 5. The emission injection current Iop is caused by the driving signal. The preliminary injection current Ipre is lower than the minimum current level that needs to cause the laser device 5 to exhibit stimulated emission. The pulse height Ipre of the preliminary injection current Ipre is so low as to cause no stimulated emission when the preliminary injection current Ipre is applied to the laser device 5. The pulse height Iop of the emission injection current Iop is set by the constant current source 2b. The preliminary injection current Ipre is set by the constant current source 4b.

The combined application of the emission injection current Iop with the preliminary injection current Ipre causes the laser device 5 to emit an optical pulse that has an abrupt rising edge. In FIG. 3, the real line represents the waveform of the optical pulse that has been generated by the laser device 5 when the preliminary injection current Ipre in combination with the emission injection current Iop are in turn applied to the laser device 5. In FIG. 3, the broken line represents the waveform of the optical pulse that has been generated by the laser device 5 when the emission injection current Iop is solely applied to the laser device 5. The optical pulse waveform of the real line has the higher abruptness in the rising edge than that of the optical pulse waveform of the broken line. The optical pulse waveform of the real line has a narrower pulse width Tw-pop than the optical pulse waveform of the broken line. The optical pulse waveform of the real line has a larger pulse height than the optical pulse waveform of the broken line. The narrow pulse width and the decreased abruptness of the rising edge of the optical pulse may decrease the height of the optical pulse, because the injection of the driving current may be discontinued during when the optical pulse is being rising. Thus, the application of the preliminary injection current Ipre to the laser device 5 prior to the application of the emission injection current Iop to the laser device 5 increases the abruptness of the rising edge of the optical pulse, and narrows the optical pulse width, as well as increases the height of the optical pulse.

It has been known that in general the laser diode has non-linearity of differential resistance with reference to driving current. The laser diode in the OFF state may exhibit a spontaneous emission but does not exhibit any stimulated emission. The laser diode in the OFF state exhibits a stimulated emission. The transition of the laser diode from the OFF state to the ON state is caused by application of the threshold driving current to the laser diode. As the driving current increases but not beyond the threshold, the resistance decreases remarkably. As the driving current exceeds the threshold and further increases, the resistance decreases slightly.

In the optical pulse generator 110, the preliminary injection current Ipre is set slightly lower than the threshold at which the transition of the laser device 5 from the OFF state to the ON state is caused. The preliminary injection current Ipre is applied to the laser device 5 before the emission injection current Iop is applied to the laser device 5. Application of the preliminary injection current Ipre to the laser device 5 reduces the resistance of the laser device 5, followed by subsequent application of the emission injection current Iop to the laser device 5, while the laser device 5 being reduced in its resistance. Namely, the application of the emission injection current Iop to the laser device 5 having reduced resistance causes the narrow pulse width and the high abruptness of the rising edge of the optical pulse.

The optical pulse, the waveform of which is shown by the real line in FIG. 3, is generated by the optical pulse generator 110. The optical pulse as generated by the optical pulse generator 110 is incident into the directional coupler 6. The optical pulse is then incident into the optical fiber F. The optical pulse is propagated through the optical fiber F, while scattered lights are generated sequentially. Some portions of the scattered light are propagated in the propagation direction in which the optical pulse is propagated. Other portions of the scattered light are propagated in the opposite direction to the propagation direction. The portions of the scattered light that are propagated in the propagation direction are so called to as "forward-scattered light". The portions of the scattered light that are propagated in the opposite direction are so called to as "backward-scattered light". The backward-scattered light is propagated through the optical fiber F in the opposite direction to the propagation direction. Then, the backward-scattered light is then incident to the directional coupler 6. The optical fiber F has one or more reflecting elements such as connectors at which the optical pulse is reflected. Thus, the reflected light is propagated through the optical fiber F in the opposite direction to the propagation direction. The reflected light is then incident into the directional coupler 6. The "backward-scattered light" and the return light are incident into the directional coupler 6. The "backward-scattered light" and the return light together are so called to as a "return light".

The return light is then reflected by the directional coupler 6. Then, the return light is transmitted to the photo-detector 7. The return light is subjected to the photoelectric-conversion performed by the photo-detector 7, whereby the return light is converted into a light receiving signal of electrical signal. The light receiving signal is then transmitted from the photo-detector 7 into the amplifier 8. The light receiving signal is amplified by the amplifier 8. The amplified light receiving signal is then transmitted to the A/D converter 9. The amplified light receiving signal is an analog signal.

Figure 4:
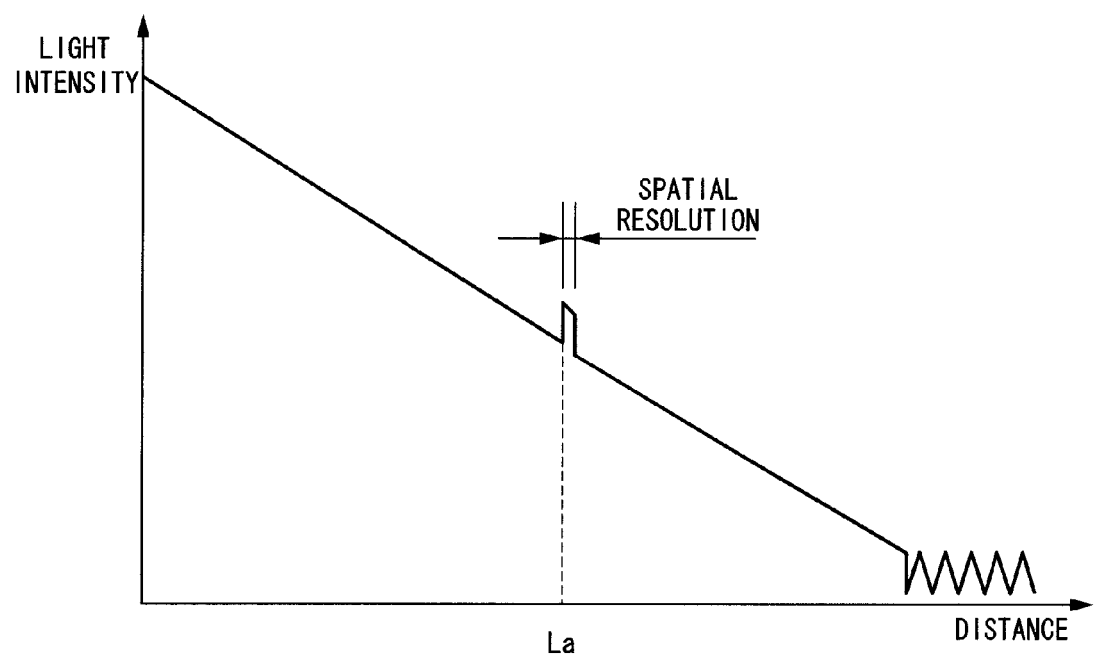
FIG. 4 is a schematic diagram illustrating a measurement screen to be displayed by a display unit included in the optical pulse tester of FIG. 1.

The amplified light receiving signal is subjected to the analog-to-digital conversion performed by the A/D converter 9, whereby the amplified light receiving signal is converted into a time series of light receiving data. The time series of light receiving data is transmitted to the display unit 10. Time-sequential conversion of the time series of light receiving data into display data is performed by the display unit 10. The display unit 10 generates and displays a measurement screen based on the display data. FIG. 4 is a schematic diagram illustrating a measurement screen to be displayed by the display unit 10 included in the optical pulse tester 100 of FIG. 1.

In the measurement screen, the total gradient of the optical intensity over distance represents the transmission loss of the optical fiber F. At the distance La, the optical intensity has abrupt variation which represents a reflection of light. The spatial resolution represents the power to identify the distance La where the reflection appears. The optical pulse generator 100 generates the optical pulse having a narrower pulse width than that generated by the conventional optical pulse generator. Narrowing the optical pulse width can improve the spatial resolution. Namely, the optical pulse generator 100 can improve the spatial resolution. The optical pulse generator 100 increases the abruptness of the rising edge of an optical pulse. The increased abruptness of the rising edge can further improve the spatial resolution.

The laser device 5 or the laser diode exhibits an amplified spontaneous emission (ASE). The intensity of the amplified spontaneous emission (ASE) depends upon a relationship between the emission injection current Iop and the preliminary injection current Ipre. The emission injection current Iop is related to the emission threshold of the laser device 5. The emission injection current Iop is generated by the driving signal. The preliminary injection current Ipre is generated by the preliminary driving signal. The return light is incident into the optical pulse tester 100 from the optical fiber F. The intensity of the return light is weak. The accuracy of measurement depends on the dynamic range that is defined by a ratio of a peak level to a noise level of an optical pulse. The accuracy of measurement also depends on the signal-to-noise ratio (S/N ratio) of the return light. Increasing the dynamic range of the optical pulse improves the accuracy of measurement. Increasing the signal-to-noise ratio (S/N ratio) of the return light also improves the accuracy of measurement. The amplified spontaneous emission (ASE) decreases the signal-to-noise ratio (S/N ratio). As shown in FIG. 3, the falling edge of the emission injection current Iop is the same timing as the falling edge of the preliminary injection current Ipre, whereby no amplified spontaneous emission (ASE) is generated following to the emission of an optical pulse. No amplified spontaneous emission (ASE) causes no decrease in the signal-to-noise ratio (S/N ratio) of the return light.

The optical pulse tester may often be driven by a power of a battery. It is necessary for the optical pulse tester to reduce the power consumption. Synchronization of the falling edges of the emission injection current Iop and the preliminary injection current Ipre suppresses unnecessary power consumption that is caused by the unnecessary application of the preliminary injection current Ipre. This allows a long battery life.

Second Embodiment

Figure 5:
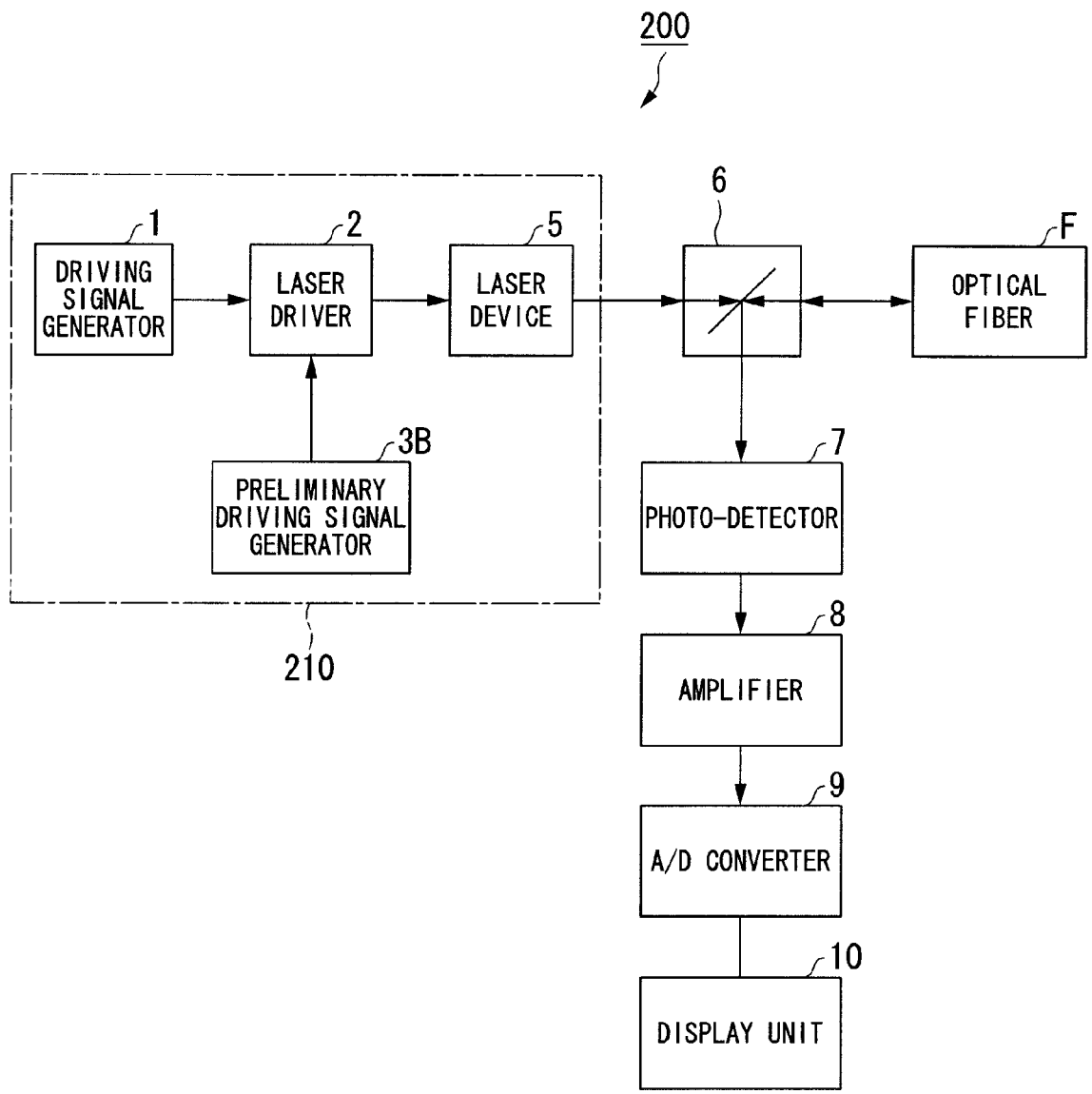
FIG. 5 is a block diagram illustrating the configuration of an optical pulse tester in accordance with a second embodiment of the present invention.

An optical pulse tester of a second embodiment of the present invention will be described. FIG. 5 is a block diagram illustrating the configuration of an optical pulse tester in accordance with a second embodiment of the present invention. An optical pulse tester 200 is different from the above-described optical pulse tester 100 in the configuration of the optical pulse generator. The same element is given the same reference number between the first and second embodiments. The optical pulse tester 200 includes an optical pulse generator 210 that may further include, but is not limited to, the driving signal generator 1, the laser driver 2, the preliminary driving signal generator 3B, and the laser device 5. In other words, the optical pulse generator 210 may further include, but is not limited to, the laser driving system and the laser device 5, where the driving system may include, but is not limited to, the driving signal generator 1, the laser driver 2, and the preliminary driving signal generator 3B.

The optical pulse generator 210 is configured to drive the driving transistor 2a in the laser driver 2 with a synthesized driving signal that is generated from the driving signal and the preliminary driving signal. The driving signal generator 1 supplies the driving signal to the base of the driving transistor 2a. The preliminary driving signal generator 3B supplies the preliminary driving signal to the base of the driving transistor 2a.

Figure 6:
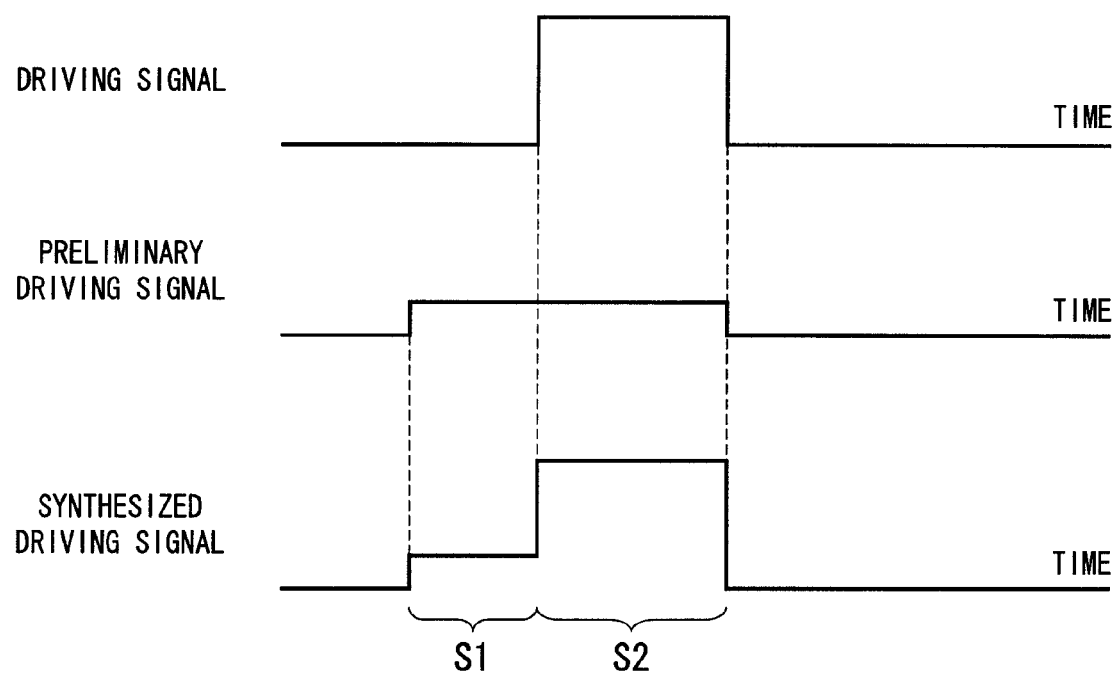
FIG. 6 is a diagram illustrating a driving signal waveform, a preliminary driving signal waveform, and a synthesized driving signal waveform of the optical pulse generator shown in FIG. 5.

As described above, the preliminary driving signal generator 3 of the first embodiment generates the preliminary driving signal that is sufficiently high to driving the driving transistor 4a to be ON and OFF. FIG. 6 is a diagram illustrating a driving signal waveform, a preliminary driving signal waveform, and a synthesized driving signal waveform of the optical pulse generator 210 shown in FIG. 5. In contrast, as shown in FIG. 6, the preliminary driving signal generator 3B of this second embodiment generates a preliminary driving signal that is lower than the preliminary driving signal generated by the preliminary driving signal generator 3. The preliminary driving signal generator 3B generates the preliminary driving signal that drives the driving transistor 4a in its active region. The preliminary driving signal and the driving signal are synthesized to generate a synthesized driving signal that has a step-like waveform as shown in FIG. 6. The falling edge of the preliminary driving signal is the same timing as the falling edge of the driving signal. Thus, the falling edge of the emission injection current Iop is synchronized with the falling edge of the preliminary injection current Ipre, whereby no amplified spontaneous emission (ASE) is generated following to the emission of an optical pulse. No amplified spontaneous emission (ASE) causes no decrease in the signal-to-noise ratio (S/N ratio) of the return light.

The waveform of the synthesized driving signal has a lower step S1 and a higher step S2. The lower step S1 is defined by the level of the preliminary driving signal. The lower step S1 defines the preliminary injection current Ipre that is lower than the minimum level that needs to stimulate the emission. The higher step S2 is defined by the total sum of the levels of the driving signal and the preliminary driving signal. The higher step S2 defines the emission injection current Iop having the pulse width Tw-iop.

The optical pulse generator 200 generates the optical pulse having a narrower pulse width than that generated by the conventional optical pulse generator. Narrowing the optical pulse width can improve the spatial resolution. Namely, the optical pulse generator 200 can improve the spatial resolution. The optical pulse generator 200 increases the abruptness of the rising edge of an optical pulse. The increased abruptness of the rising edge can further improve the spatial resolution.

Modifications:

The above-described first and second embodiments can be modified as follows.

First, it is possible as a modification that the falling edge of the preliminary driving signal is earlier than the falling edge of the driving signal. In accordance with the above-described first and second embodiments, however, the falling edge of the preliminary driving signal is the same timing as the falling edge of the driving signal.

The above-described optical pulse generator can be applied to other device or system than the above-described optical pulse tester. In some cases, it may be permissible for other device or system to reduce the reduction of the signal-to-noise ratio of the return light due to the above-described amplified spontaneous emission (ASE). In this case, it is possible as a further modification that the preliminary driving signal is always kept in high level (H). In this case, it is also possible as a furthermore modification that the falling edge of the preliminary driving signal is later than the falling edge of the driving signal.

Second, it is possible as a modification to apply the optical pulse generator to other device or system than the optical pulse tester.

Third Embodiment

Figure 7:
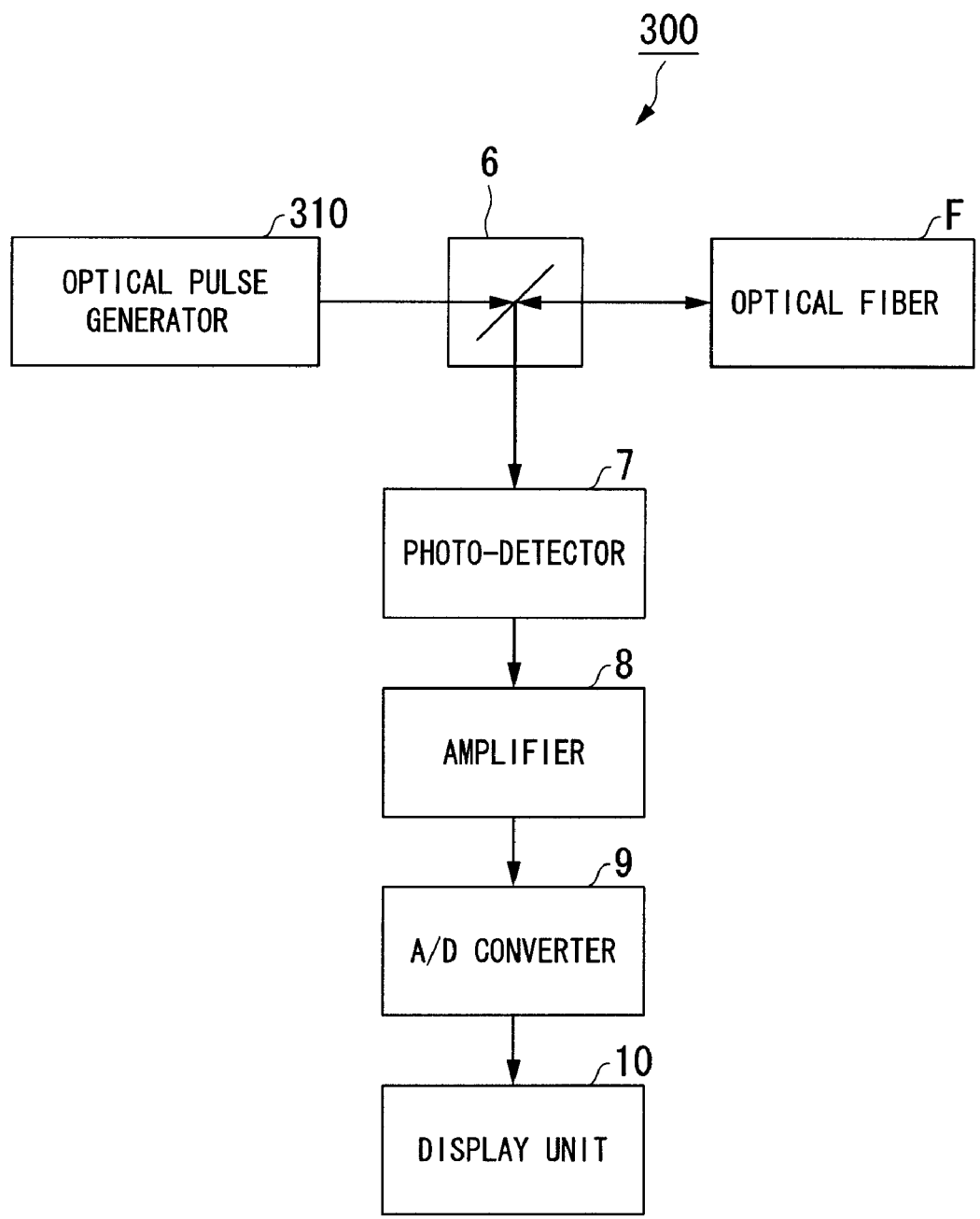
FIG. 7 is a block diagram illustrating the configuration of an optical pulse tester in accordance with a third embodiment of the present invention.

A third embodiment of the present invention will be described. FIG. 7 is a block diagram illustrating the configuration of an optical pulse tester in accordance with a third embodiment of the present invention. An optical pulse tester 300 is, in use, optically coupled to an optical fiber F. The optical pulse tester 300 may typically include, but is not limited to, an optical pulse generator 310, the directional coupler 6, the photo-detector 7, the amplifier 8, the A/D converter 9, and the display unit 10. The same element is given the same reference number between the first and third embodiments.

Figure 8:
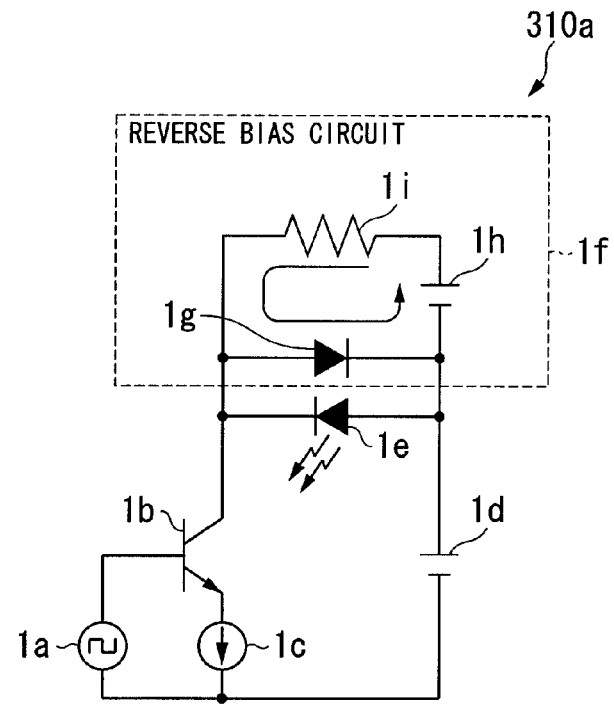
FIG. 8 is a circuit diagram illustrating an optical pulse generator included in the optical pulse tester of FIG. 7.

FIG. 8 is a circuit diagram illustrating an optical pulse generator 310 included in the optical pulse tester 300 of FIG. 7. The optical pulse generator 310 may include, but is not limited to, a control signal source 1a, a driving transistor 1b, a constant current source 1c, a constant voltage source 1d, a laser diode 1e, and a reverse bias circuit 1f. In other words, the optical pulse generator 310 may include the laser diode 1e and a driving circuit, wherein the driving circuit includes the control signal source 1a, the driving transistor 1b, the constant current source 1c, the constant voltage source 1d, and the reverse bias circuit 1f.

The control signal source 1a generates a control signal having a narrow pulse width of about a few nanoseconds. The control signal source 1a supplies the control signal to a base of the driving transistor 1b. The driving transistor 1b is an emitter-grounded NPN transistor. The driving transistor 1b has a collector as an output that is connected in series to the constant voltage source 1d and the laser diode 1e. The driving transistor 1b has a base as an input that is connected to the control signal source 1a to receive the control signal. The driving transistor 1b has an emitter that is connected to the constant current source 1c.

The constant current source 1c sets an emitter current of the driving transistor 1b. The driving transistor 1b has a collector current that is almost equivalent to the emitter current. The constant voltage source 1d applies a forward bias to the collector as the output of the driving transistor 1b. The constant voltage source 1d also applies the forward bias to the laser diode 1e. The constant voltage source 1d has a positive electrode that is connected to an anode of the laser diode 1e. The laser diode 1e has a cathode that is connected to the collector of the driving transistor 1b.

The reverse bias circuit 1f includes a bias diode 1g, a constant voltage source 1h and a resistance 1i. The bias diode 1g has a cathode that is connected to the anode of the laser diode 1e and also to a negative electrode of the constant voltage source 1h. The bias diode 1g has an anode that is connected to the cathode of the laser diode 1e and a first side of the resistance 1i. The constant voltage source 1h has a positive electrode that is connected to a second side of the resistance 1i. The reverse bias circuit 1f has a closed-loop circuit that includes the bias diode 1g, the constant voltage source 1h and the resistance 1i. The anode and the cathode of the bias diode 1g are respectively connected to the cathode and the anode of the laser diode 1e.

With reference back to FIG. 7, the optical coupler 6 is optically coupled to the laser device 5 to receive an incidence of an optical pulse signal that has been emitted from the laser device 5. As described above, the optical coupler 6 is also optically coupled to the optical fiber F. The optical coupler 6 is also coupled to the photo-detector 7. The optical coupler 6 is configured to transmit the incident optical pulse to the optical fiber F. The optical coupler 6 also receives an incident of a return light from the optical fiber F. The optical coupler 6 is configured to reflect the return light toward the photo-detector 7. In other words, the optical coupler 6 is configured to emit the return light toward the photo-detector 7.

The photo-detector 7 is configured to perform a photoelectric conversion that converts the return light into a light-receiving electric signal. The photo-detector 7 is electrically coupled to the amplifier 8 so that the photo-detector 7 supplies the light-receiving electric signal to the photo-detector 7.

The amplifier 8 receives the light-receiving electric signal from the photo-detector 7. The amplifier 8 is configured to amplify the light-receiving electric signal by a predetermined amplification degree, thereby generating an amplified electric signal. The amplifier 8 is electrically coupled to the A/D converter 9 so that the amplifier 8 supplies the amplified electric signal to the A/D converter 9. The amplified electric signal is an analog signal.

The A/D converter 9 receives the amplified electric signal as the analog signal from the amplifier 8. The A/D converter 9 is configured to perform sampling of the amplified electric signal as the analog signal at a predetermined time interval, thereby causing analog-to-digital conversion from the amplified electric signal as the analog signal to light receiving data as a digital signal. The light receiving data as the digital signal is a set of time series data that show the time-variation in the intensity of the return light. The A/D converter 9 is electrically coupled to the display unit 10 so that the A/D converter 9 supplies the light receiving data to the display unit 10.

The display unit 10 receives the time-series of light receiving data from the A/D converter 9. The display unit 10 is configured to time-sequentially apply the predetermined signal processing to the data, thereby performing time-sequential conversion of the data into display data. The display unit 10 is configured to display a measurement screen based on the display data. The measurement screen shows the distances of the optical fiber F from the reference point of the optical pulse tester 100, wherein the distances were converted from the time-variations in the intensity of the return light.

Figure 9:
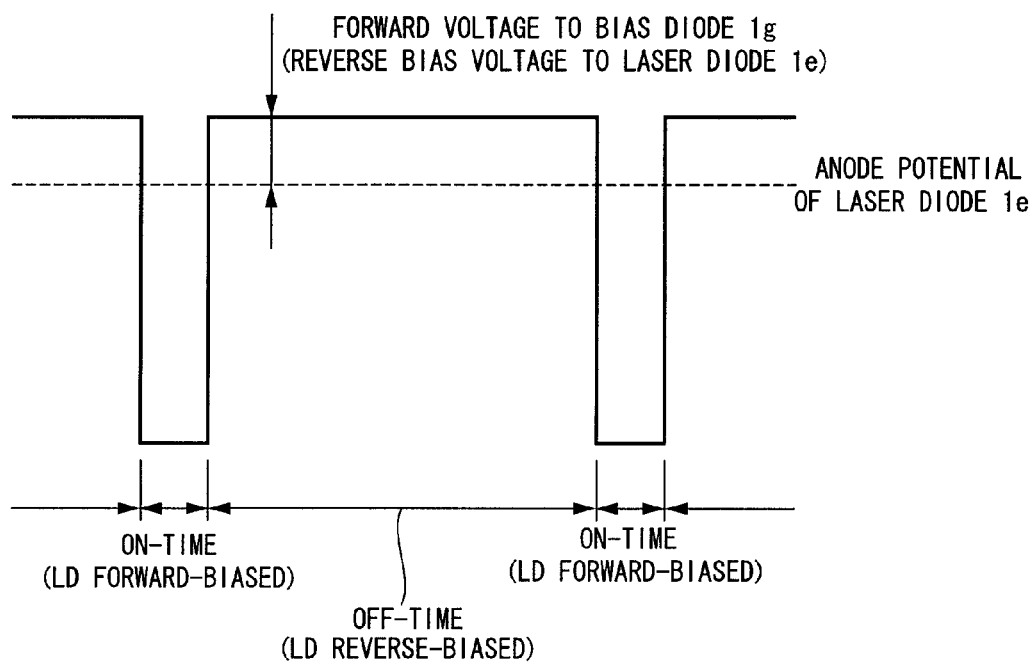
FIG. 9 is a diagram illustrating the waveform of a voltage applied to a laser diode of the optical pulse generator shown in FIG. 8.

The following descriptions will involve operations of the above-described optical pulse tester 100 and operations of the above-described optical pulse generator 110. FIG. 9 is a diagram illustrating the waveform of a voltage applied to the laser diode 1e of the optical pulse generator shown in FIG. 8. The driving transistor 1b is controlled by the control signal from the control signal source 1a. In ON-time, the driving transistor 1b is placed in the ON-state. In OFF-time, the driving transistor 1b is placed in the OFF-state.

The driving transistor 1b is reverse-biased with the reverse bias voltage that is applied by the reverse bias circuit 1f, while the driving transistor 1b is placed in the OFF state. The reverse bias is applied from the constant voltage source 1h through the resistance 1i to the driving transistor 1b. The reverse bias voltage is a forward bias voltage of the bias diode 1g that is connected to the laser diode 1e. If the bias diode 1g is a silicon diode, the reverse bias voltage is about 0.6V.

The driving transistor 1b is transitioned by the control signal from the OFF state into the ON state, whereby the constant voltage source 1d applies a forward bias voltage to the laser diode 1e. The forward bias voltage exceeds the reviser bias voltage. Thus, the constant voltage source 1d applies the driving current to the laser diode 1e so that the laser diode 1e generates an optical pulse.

Figure 10:
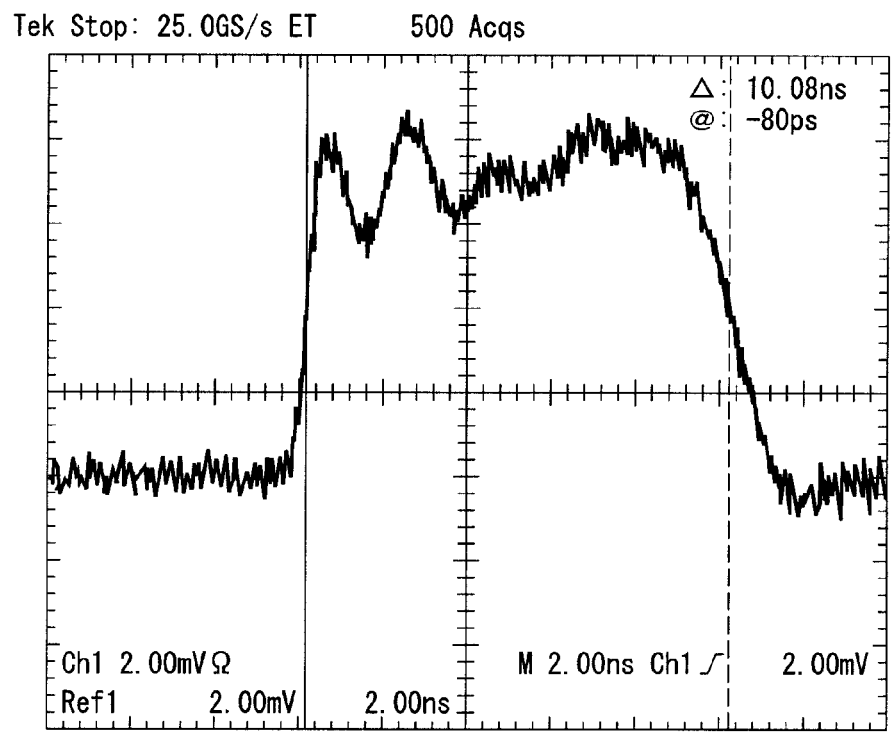
FIG. 10 is a diagram illustrating the waveform of an optical pulse emitted from a laser diode that is reverse-biased by a reverse bias circuit included in the optical pulse generator of FIG. 8.
Figure 11:
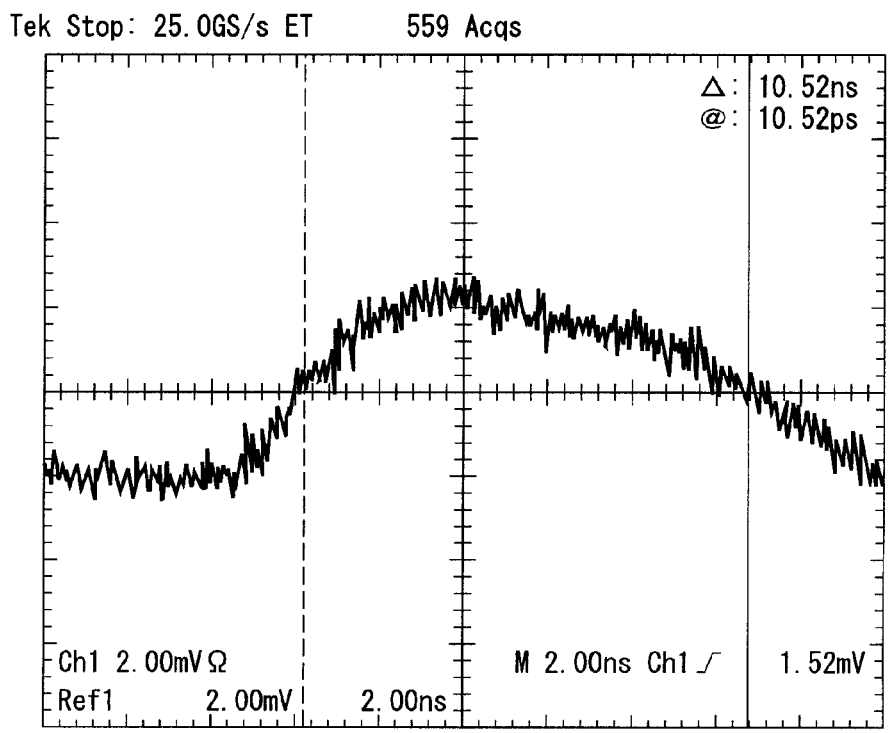
FIG. 11 is a diagram illustrating the waveform of an optical pulse emitted from a laser diode in the conventional optical pulse generator free of any reverse bias circuit.

FIG. 10 is a diagram illustrating the waveform of an optical pulse emitted from the laser diode 1e that is reverse-biased by the reverse bias circuit included in the optical pulse generator 310a of FIG. 8, where the pulse width of the control signal is set 10 nanoseconds. FIG. 11 is a diagram illustrating the waveform of an optical pulse emitted from a laser diode in the conventional optical pulse generator free of any reverse bias circuit, where the pulse width of the control signal is set 10 nanoseconds. The waveform of the optical pulse emitted from the optical pulse generator 310a including the revise bias circuit 1f has remarkably higher abruptness of rising and falling edges than those of the waveform of the optical pulse emitted from the conventional pulse generator free of any reverse bias circuit. The waveform of the optical pulse emitted from the optical pulse generator 310a is greater in the pulse height by about two times than the waveform of the optical pulse emitted from the conventional optical pulse generator. The waveform of the optical pulse emitted from the optical pulse generator 310a has a wider dynamic range by about 6 dB than that of the waveform of the optical pulse emitted from the conventional optical pulse generator.

Figure 12:
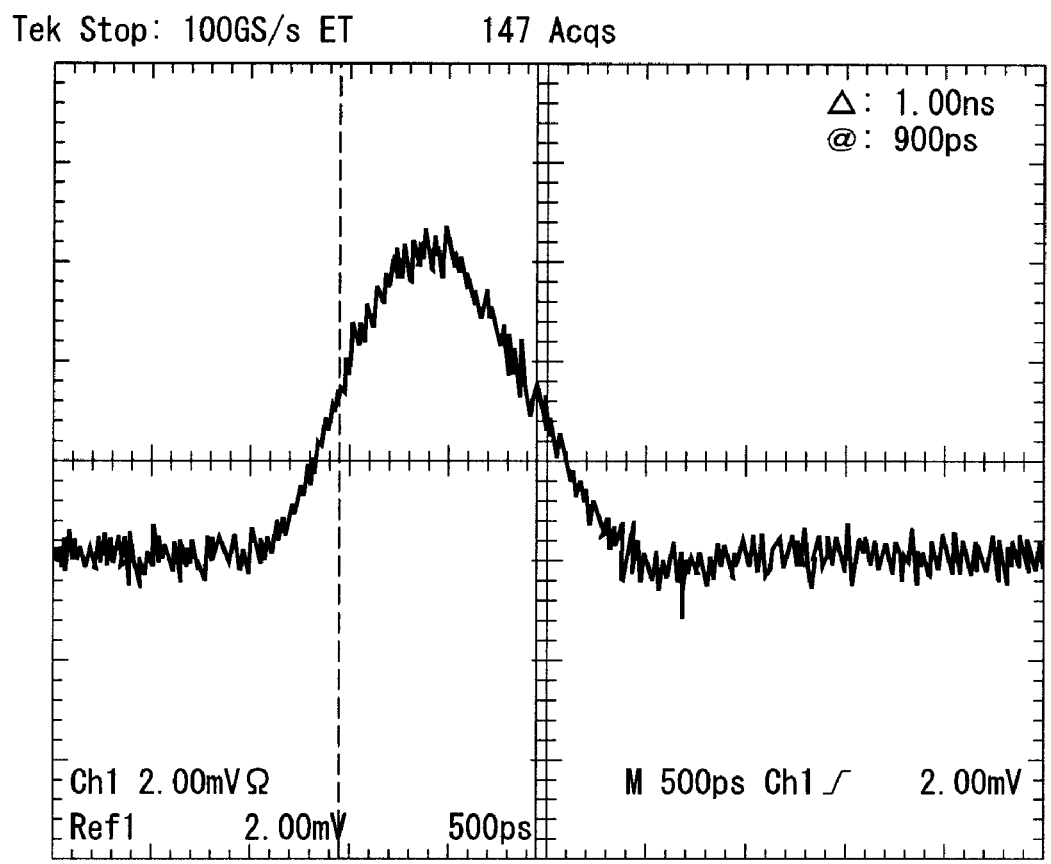
FIG. 12 is a diagram illustrating the waveform of an optical pulse emitted from a laser diode that is reverse-biased by a reverse bias circuit included in the optical pulse generator of FIG. 8.

FIG. 12 is a diagram illustrating the waveform of an optical pulse emitted from the laser diode 1e that is reverse-biased by the reverse bias circuit included in the optical pulse generator 310a of FIG. 8, where the pulse width of the control signal is set 5 nanoseconds. The pulse width of the control signal of FIG. 12 is a half of those of the control signals of FIGS. 10 and 11. The waveform in FIG. 12 of the optical pulse emitted from the optical pulse generator 310a has higher abruptness of rising and falling edges than those of the waveform in FIG. 11 of the optical pulse emitted from the conventional pulse generator free of any reverse bias circuit. The waveform in FIG. 12 of the optical pulse emitted from the optical pulse generator 310a is greater in the pulse height than the waveform in FIG. 11 of the optical pulse emitted from the conventional optical pulse generator. The waveform in FIG. 12 of the optical pulse emitted from the optical pulse generator 310a has a wider dynamic range than that of the waveform in FIG. 11 of the optical pulse emitted from the conventional optical pulse generator.

The optical pulse as generated by the optical pulse generator 310 is incident into the directional coupler 6. The optical pulse is then incident into the optical fiber F. The optical pulse is propagated through the optical fiber F, while scattered lights are generated sequentially. The forward-scattered light is propagated in the propagation direction, while the backward-scattered light is propagated in the opposite direction to the propagation direction. Then, the backward-scattered light is then incident to the directional coupler 6. The optical fiber F has one or more reflecting elements such as connectors at which the optical pulse is reflected. Thus, the reflected light is propagated through the optical fiber F in the opposite direction to the propagation direction. The reflected light is then incident into the directional coupler 6. The "backward-scattered light" and the return light are incident into the directional coupler 6. The "backward-scattered light" and the return light together are so called to as a "return light".

The return light is then reflected by the directional coupler 6. Then, the return light is transmitted to the photo-detector 7. The return light is subjected to the photoelectric-conversion performed by the photo-detector 7, whereby the return light is converted into a light receiving signal of electrical signal. The light receiving signal is then transmitted from the photo-detector 7 into the amplifier 8. The light receiving signal is amplified by the amplifier 8. The amplified light receiving signal is then transmitted to the A/D converter 9. The amplified light receiving signal is an analog signal.

Figure 13:
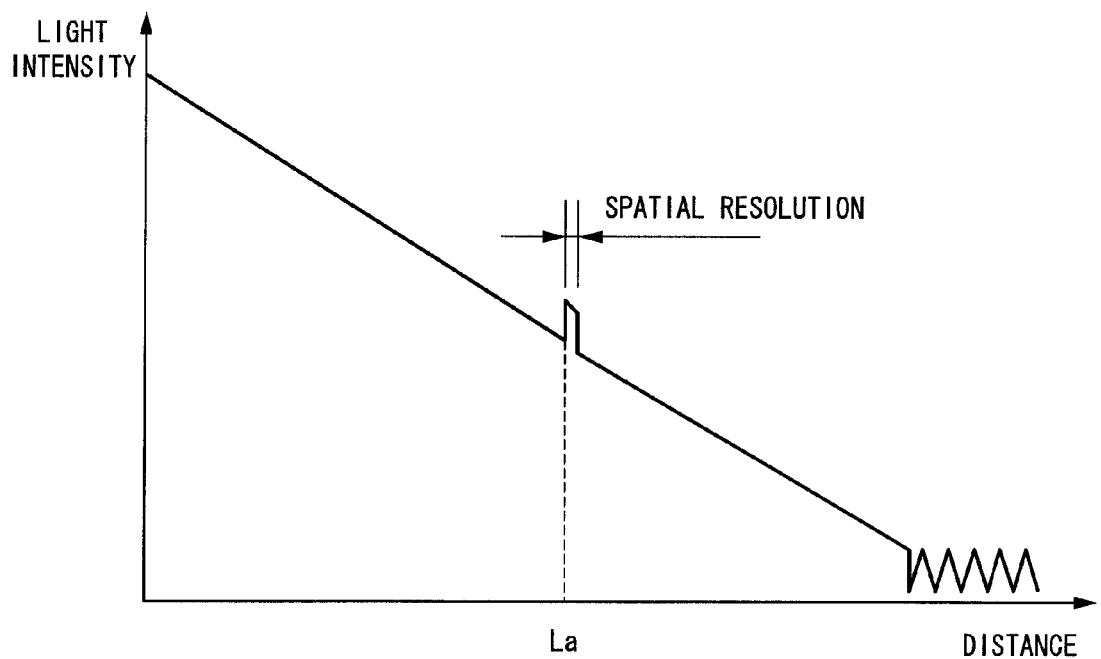
FIG. 13 is a schematic diagram illustrating a measurement screen to be displayed by a display unit included in the optical pulse tester of FIG. 7.

The amplified light receiving signal is subjected to the analog-to-digital conversion performed by the A/D converter 9, whereby the amplified light receiving signal is converted into a time series of light receiving data. The time series of light receiving data is transmitted to the display unit 10. Time-sequential conversion of the time series of light receiving data into display data is performed by the display unit 10. The display unit 10 generates and displays a measurement screen based on the display data. FIG. 13 is a schematic diagram illustrating a measurement screen to be displayed by the display unit 10 included in the optical pulse tester 300 of FIG. 7.

In the measurement screen, the total gradient of the optical intensity over distance represents the transmission loss of the optical fiber F. At the distance La, the optical intensity has abrupt variation which represents a reflection of light. The spatial resolution represents the power to identify the distance La where the reflection appears. The optical pulse generator 300 generates the optical pulse having a narrower pulse width than that generated by the conventional optical pulse generator. Narrowing the optical pulse width can improve the spatial resolution. Namely, the optical pulse generator 300 can improve the spatial resolution. The optical pulse generator 300 increases the abruptness of the rising and falling edges of an optical pulse as well as increases the pulse height thereof. The increased abruptness and the increased pulse height can further improve the spatial resolution.

Fourth Embodiment

Figure 14:
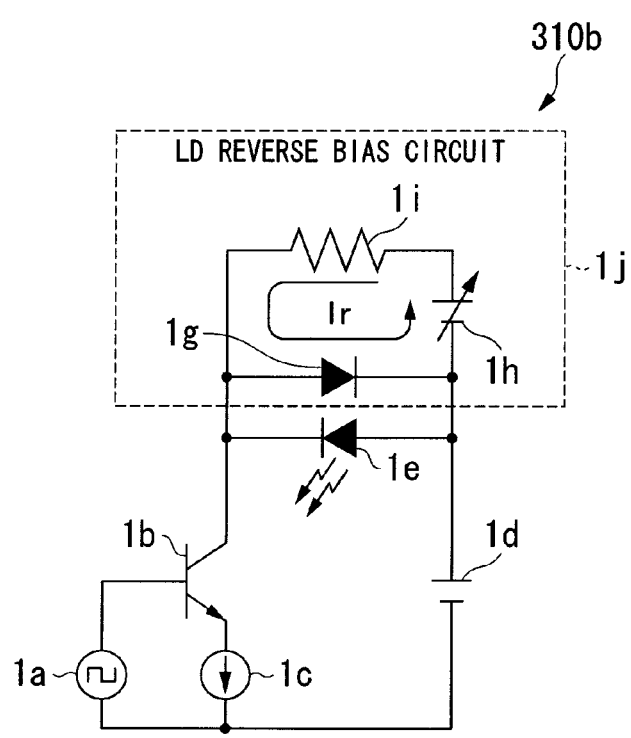
FIG. 14 is a circuit diagram illustrating an optical pulse generator included in the optical pulse tester in accordance with a fourth embodiment of the present invention.

An optical pulse tester of a fourth embodiment of the present invention will be described. An optical pulse tester of the fourth embodiment is different from the optical pulse tester of the third embodiment in the configuration of the optical pulse generator therein. FIG. 14 is a circuit diagram illustrating an optical pulse generator included in the optical pulse tester in accordance with a fourth embodiment of the present invention. An optical pulse generator 310b of FIG. 14 is different from the above-described optical pulse generator 310a of FIG. 8 in the configuration of a reverse bias circuit. The optical pulse generator 310b of FIG. 14 includes a reverse bias circuit 1j which is different in its configuration from the reverse bias circuit 1f of the optical pulse generator 310a of FIG. 8. The reverse bias circuit 1j of FIG. 14 has a variable voltage supply 1h. In contrast, the reverse bias circuit 1f has the constant voltage supply 1h.

The variable voltage supply 1h performs as a reverse bias setting element. The variable voltage supply 1k is configured to variably set its output voltage, thereby variably setting a reverse bias current Ir that flows through the reverse bias circuit 1j. The reverse bias current Ir is variably set in a predetermined range. It should be noted, however, that the reverse bias current Ir performs as a reverse bias current for the laser diode 1e, but the reverse bias current Ir performs as a forward bias current for the bias diode 1g. The reverse bias current Ir is given by Ir=(E−Ed)/R, where E represents the output voltage from the variable voltage supply 1h, R represents the resistance value of the resistance 1i, and Ed represents the forward voltage of the bias diode 1g.

Figure 15:
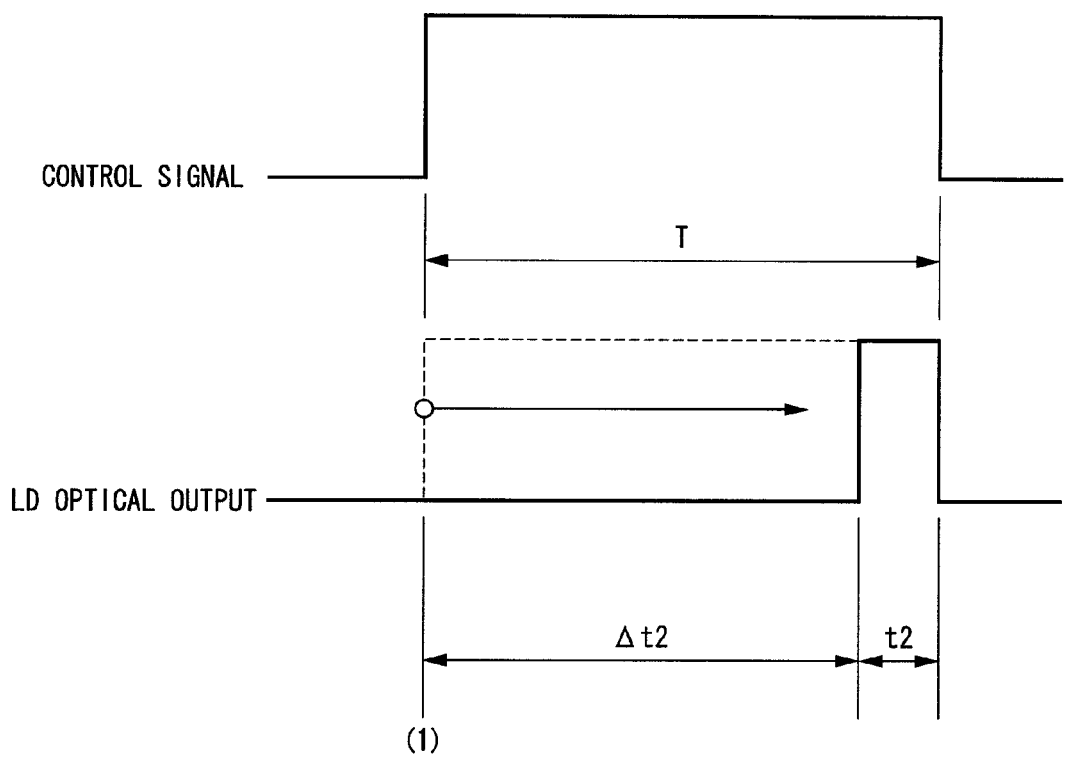
FIG. 15 is a diagram illustrating the waveforms of a control signal and an LD optical output in the optical pulse generator of FIG. 14.
Figure 16:
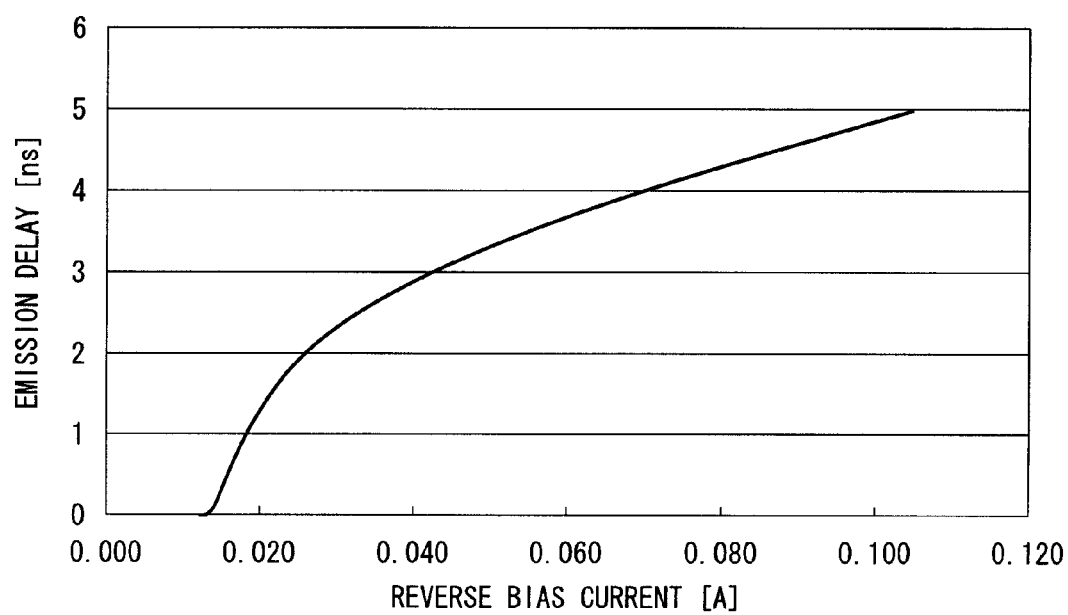
FIG. 16 is a diagram illustrating variations of an emission delay over reverse bias current in the optical pulse generator of FIG. 14.

FIG. 15 is a diagram illustrating the waveforms of a control signal and an LD optical output in the optical pulse generator 310b of FIG. 14. FIG. 16 is a diagram illustrating variations of an emission delay over reverse bias current in the optical pulse generator 310b of FIG. 14. As shown in FIG. 15, the rising edge of the optical pulse that is emitted from the laser diode 1e is delayed by Δt2 from the rising edge of the control signal. The falling edge of the optical pulse is the same timing as the falling edge of the control signal. The optical pulse has a pulse width t2 which is narrower by Δt2 than the pulse width of the control signal. This emission delay Δt2 increases as the reverse bias current Ir increases. The emission delay Δt2 takes a significant amount when the reverse bias current Ir is set equal to or higher than a predetermined value, for example, about 17 mA. The emission delay Δt2 is controllable by controlling the reverse bias current Ir. The pulse width t2 of the optical pulse is narrowed as the emission delay Δt2 increases. Thus, the pulse width t2 of the optical pulse is controllable by controlling the reverse bias current Ir. Namely, the pulse width t2 of the optical pulse is narrowed by increasing the reverse bias current Ir. Narrowing the pulse width t2 of the optical pulse can improve the spatial resolution. Namely, increasing the reverse bias current Ir can improve the spatial resolution.

The optical pulse generator 310b is configured to vary the reverse bias current Ir thereby varying the pulse width of the optical pulse. Namely, the optical pulse generator 310b is configured to adjust the timing of the rising edge by adjusting the reverse bias current Ir, thereby adjusting the pulse width of the optical pulse.

Modifications:

The above-described third and fourth embodiments can be modified as follows.

In accordance with the above-described third and fourth embodiments, the optical pulse generators 310a and 310b are applied to the optical pulse tester. However, it is possible as a modification that the optical pulse generators 310a and 310b are also applicable to other device or system that needs at least one of the abruptness of rising and/or falling edges of an optical pulse, the increased pulse height thereof, and the narrowed pulse width thereof.

In accordance with the above-described third and fourth embodiments, the reverse bias circuits 1f and 1j are realized by the constant voltage source 1h or the variable voltage source 1k, the resistance 1i, and the bias diode 1g. The reverse bias circuits 1f and 1j apply the reverse bias voltage to the laser diode 1e, wherein the reverse bias voltage performs as a forward bias voltage to the bias diode 1g. If the bias diode 1g is realized by a silicon diode, then the reverse bias voltage is about 0.6V. The reverse bias voltage needs to be lower than the reverse breakdown voltage of the laser diode 1e. The reverse bias circuit can be realized by other circuit configuration as long as the other circuit configuration can set the reverse bias voltage that is lower than the reverse breakdown voltage of the laser diode 1e. For example, a germanium diode or a constant voltage diode can be used for the bias diode 1g for adjusting or varying the reverse bias voltage.

In accordance with the above-described fourth embodiment, the variable voltage source 1k is used as the reverse bias setting element. For example, a variable resistance can be used for the resistance 1i to realize the reverse bias setting element.

In accordance with the above-described fourth embodiment, the optical pulse generator can not only provide the increased abruptness of rising and/or falling edges of an optical pulse, the increased height thereof, and the narrowed pulse width thereof, but also be applicable to other devices or systems that need the variability of the pulse width of an optical pulse. Typical examples of the other devices or systems may include, but are not limited to, a pulse width modulator, a pulse width regulator, a variable triggering device that needs the delay of the rising edge.

Fifth Embodiment

Figure 17:
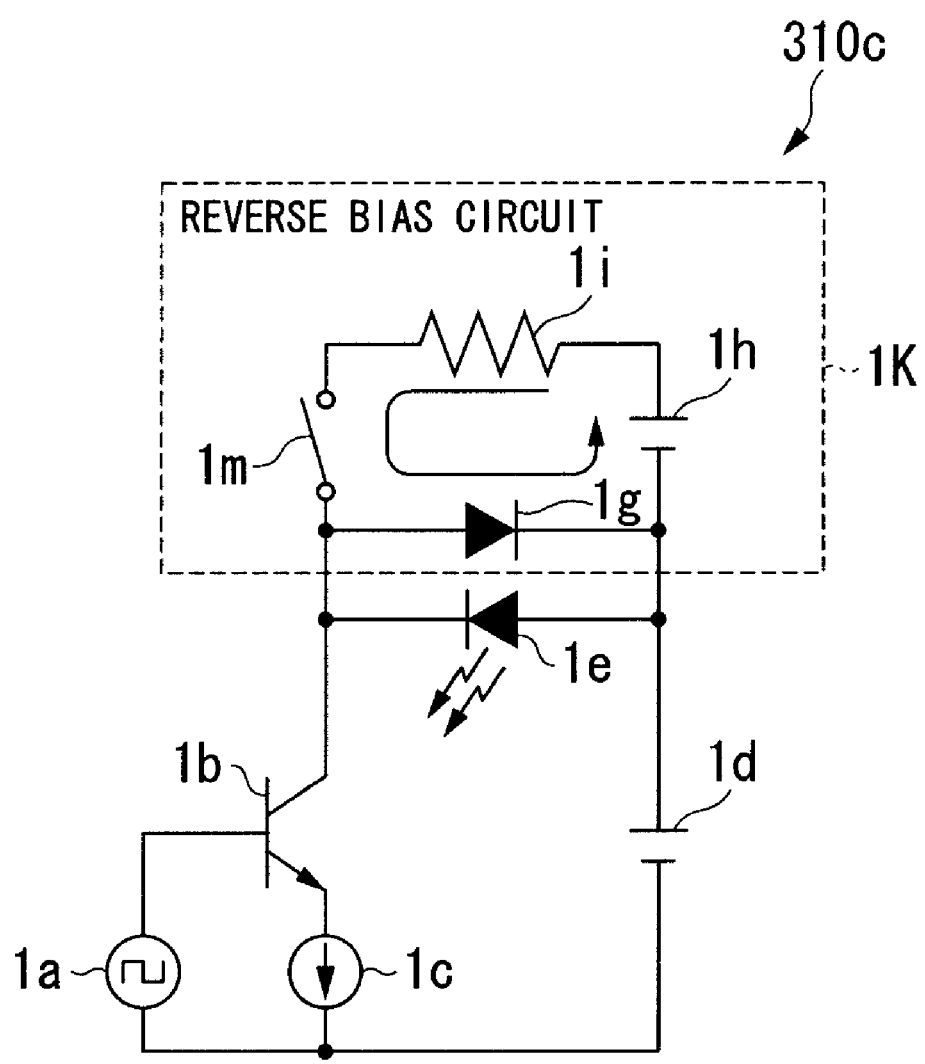
FIG. 17 is a circuit diagram illustrating an optical pulse generator included in the optical pulse tester in accordance with a fifth embodiment of the present invention.

An optical pulse tester of a fifth embodiment of the present invention will be described. An optical pulse tester of the fifth embodiment is different from the optical pulse tester of the third embodiment in the configuration of the optical pulse generator therein. FIG. 17 is a circuit diagram illustrating an optical pulse generator included in the optical pulse tester in accordance with a fifth embodiment of the present invention. An optical pulse generator 310c of FIG. 17 is different from the above-described optical pulse generator 310a of FIG. 8 in the configuration of a reverse bias circuit. The optical pulse generator 310c of FIG. 17 includes a reverse bias circuit 1k which is different in its configuration from the reverse bias circuit 1f of the optical pulse generator 310a of FIG. 8. The reverse bias circuit 1k of FIG. 17 has a switch 1m. In contrast, the reverse bias circuit 1f has no switch.

The switch 1m is connected between the resistance 1i and the cathode of the bias diode 1g and the anode of the laser diode 1e. The switch 1m can be realized by a photo MOS relay that opens and closes, where a photo diode turns a photo MOSFET ON and OFF. Namely, the photo MOS relay can be sued as the switch 1m to establish an electrical isolation between a digital circuit that controls the switch 1m and the optical pulse generator 310c. The electrical isolation prevents any digital noise from entering into the optical pulse generator 310c from the digital circuit.

The switch 1m is closed so that the reverse bias current is applied to the laser diode 1e, whereby the optical pulse generator 310c generates an optical pulse with a narrower pulse width. The switch 1m is opened so that no reverse bias current is applied to the laser diode 1e, whereby the optical pulse generator 310c generates an optical pulse with a wider pulse width. Opening and closing the switch 1m change the pulse width of an optical pulse that is generated by the optical pulse generator 310c.

It is unnecessary to increase the abruptness of rising and/or falling edges of an optical pulse, when an optical pulse with a wider pulse width is used to perform the test on the properties of an optical fiber. It is necessary to increase the abruptness of rising and/or falling edges of an optical pulse, when an optical pulse with a narrower pulse width is used to perform the test on the properties of an optical fiber. Increase in the abruptness is increased of rising and/or falling edges of an optical pulse with a relatively wide pulse width may cause overshoot and ringing. Overshoot and ringing reduce the spatial resolution because overshoot and ringing cause the disturbance to rising and falling edges of abrupt variation of the optical intensity at the distance La in FIG. 13, where the abrupt variation which represents a reflection of light.

When the optical pulse with a relatively wide pulse width is used, the switch 1m is opened to suppress overshoot and ringing thereby suppressing the reduction of the spatial resolution.

In accordance with this embodiment, the photo MOS relay is used as the switch 1m. The switch 1m can be realized by any other switches.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical pulse generator comprising:
a light emitting element that emits an optical pulse; and
a driver configured to apply a pulse driving current to the light emitting element to allow the light emitting element to emit an optical pulse, the driver being also configured to apply a preliminary driving current to the light emitting element in a period of time between before and after starting the application of the pulse driving current, and wherein the preliminary driving current is lower than a minimum level that needs to cause a stimulated emission of light,
wherein the driver further comprises:
a driving signal generator configured to generate a driving signal;
a driving unit configured to receive the driving signal from the driving signal generator, the driving unit being also configured to apply the pulse driving current to the light emitting element based on the driving signal;
a preliminary signal generator configured to generate a preliminary driving signal; and
a preliminary driving unit configured to receive the preliminary driving signal from the preliminary signal generator, the preliminary driving unit being also configured to apply the preliminary driving current to the light emitting element based on the preliminary driving signal.

2. An optical pulse generator comprising:
a light emitting element that emits an optical pulse; and
a driver configured to apply a pulse driving current to the light emitting element to allow the light emitting element to emit an optical pulse, the driver being also configured to apply a preliminary driving current to the light emitting element in a period of time between before and after starting the application of the pulse driving current, and wherein the preliminary driving current is lower than a minimum level that needs to cause a stimulated emission of light,
wherein the driver further comprises:
a driving signal generator configured to generate a driving signal;
a preliminary signal generator configured to generate a preliminary driving signal; and
a driving unit configured to receive the driving signal from the driving signal generator, the driving unit being also configured to receive the preliminary driving signal from the preliminary signal generator, the driving unit being also configured to apply the pulse driving current to the light emitting element based on the driving signal, and the driving unit being also configured to apply the preliminary driving current to the light emitting element based on the preliminary driving signal.

3. An optical pulse tester that supplies an optical pulse to an optical fiber, the optical pulse tester receiving a return light from the optical fiber, the optical pulse tester determining the properties of the optical fiber based on the return light, the optical pulse tester comprising an optical pulse generator, the optical pulse generator further comprising:
a light emitting element that emits an optical pulse; and
a driver configured to apply a pulse driving current to the light emitting element to allow the light emitting element to emit an optical pulse, the driver being also configured to apply a preliminary driving current to the light emitting element in a period of time between before and after starting the application of the pulse driving current, wherein the preliminary driving current is lower than a minimum level that needs to cause a stimulated emission of light,
wherein the driver further comprises:
a driving signal generator configured to generate a driving signal;
a driving unit configured to receive the driving signal from the driving signal generator, the driving unit being also configured to apply the pulse driving current to the light emitting element based on the driving signal;
a preliminary signal generator configured to generate a preliminary driving signal; and
a preliminary driving unit configured to receive the preliminary driving signal from the preliminary signal generator, the preliminary driving unit being also configured to apply the preliminary driving current to the light emitting element based on the preliminary driving signal.

4. An optical pulse tester that supplies an optical pulse to an optical fiber, the optical pulse tester receiving a return light from the optical fiber, the optical pulse tester determining the properties of the optical fiber based on the return light, the optical pulse tester comprising an optical pulse generator, the optical pulse generator further comprising:
a light emitting element that emits an optical pulse; and
a driver configured to apply a pulse driving current to the light emitting element to allow the light emitting element to emit an optical pulse, the driver being also configured to apply a preliminary driving current to the light emitting element in a period of time between before and after starting the application of the pulse driving current, wherein the preliminary driving current is lower than a minimum level that needs to cause a stimulated emission of light,
wherein the driver further comprises:
a driving signal generator configured to generate a driving signal;
a preliminary signal generator configured to generate a preliminary driving signal; and
a driving unit configured to receive the driving signal from the driving signal generator, the driving unit being also configured to receive the preliminary driving signal from the preliminary signal generator, the driving unit being also configured to apply the pulse driving current to the light emitting element based on the driving signal, and the driving unit being also configured to apply the preliminary driving current to the light emitting element based on the preliminary driving signal.

5. An optical pulse generator comprising:
a light emitting element that emits an optical pulse; and
a driver comprising a forward bias circuit and a reverse bias circuit, the reverse bias circuit being configured to apply a reverse bias voltage to the light emitting element, the forward bias circuit being configured to apply a first forward bias voltage to the light emitting element that is being applied with the reverse bias voltage so as to apply a driving current to the light emitting element, and
wherein the light emitting element is a laser diode having an anode and a cathode, and
the reverse bias circuit comprises:
a bias diode having a cathode that is directly connected to the anode of the laser diode, the bias diode having an anode that is directly connected to the cathode of the laser diode; and
a voltage supply that applies the reverse bias voltage to the light emitting element through a resistance, the voltage supply applying a second forward bias voltage to the bias diode through the resistance.

6. The optical pulse generator according to claim 5, wherein the reverse bias circuit comprises:
a switch that selectively discontinues application of the reverse bias voltage to the light emitting element.

7. An optical pulse tester that supplies an optical pulse to an optical fiber, the optical pulse tester receiving a return light from the optical fiber, the optical pulse tester determining properties of the optical fiber based on the return light, the optical pulse tester comprising an optical pulse generator, the optical pulse generator comprising:
a light emitting element that emits the optical pulse; and
a driver comprising a forward bias circuit and a reverse bias circuit, the reverse bias circuit being configured to apply a reverse bias voltage to the light emitting element, the forward bias circuit being configured to apply a first forward bias voltage to the light emitting element that is being applied with the reverse bias voltage so as to apply a driving current to the light emitting element, and
wherein the light emitting element is a laser diode having an anode and a cathode, and
the reverse bias circuit comprises:
a bias diode having a cathode that is directly connected to the anode of the laser diode, the bias diode having an anode that is directly connected to the cathode of the laser diode; and a voltage supply that applies the reverse bias voltage to the light emitting element through a resistance, the voltage supply applying a second forward bias voltage to the bias diode through the resistance.

8. The optical pulse tester according to claim 7, wherein the reverse bias circuit comprises:

a switch that selectively discontinues application of the reverse bias voltage to the light emitting element.

9. An optical pulse generator comprising:

a light emitting element that emits an optical pulse; and a driver comprising a forward bias circuit and a reverse bias circuit, the reverse bias circuit being configured to apply a reverse bias voltage to the light emitting element, the forward bias circuit being configured to apply a first forward bias voltage to the light emitting element that is being applied with the reverse bias voltage so as to apply a driving current to the light emitting element, and wherein the light emitting element is a laser diode having an anode and a cathode, the reverse bias circuit comprises:

a bias diode having a cathode that is directly connected to the anode of the laser diode, the bias diode having an anode that is directly connected to the cathode of the laser diode;

a resistance that is connected to the bias diode; and a first voltage supply that applies the reverse bias voltage to the light emitting element through the resistance, the first voltage supply applying a second forward bias voltage to the bias diode through the resistance, and the forward bias circuit comprises:

a second voltage supply that is directly connected to the anode of the laser diode and the cathode of the bias diode, the second voltage supply applying the first forward bias voltage to the laser diode;

a transistor having a base, an emitter and a collector, the collector being connected to the cathode of the laser diode and the anode of the bias diode;

a constant current source that is connected to the emitter of the transistor; and a control signal source that is connected to the base of the transistor.

10. The optical pulse generator according to claim 9, wherein the reverse bias circuit comprises:

a switch that selectively discontinues application of the reverse bias voltage to the light emitting element.

11. An optical pulse tester that supplies an optical pulse to an optical fiber, the optical pulse tester receiving a return light from the optical fiber, the optical pulse tester determining properties of the optical fiber based on the return light, the optical pulse tester comprising an optical pulse generator, the optical pulse generator comprising:

a light emitting element that emits the optical pulse; and a driver comprising a forward bias circuit and a reverse bias circuit, the reverse bias circuit being configured to apply a reverse bias voltage to the light emitting element, the forward bias circuit being configured to apply a first forward bias voltage to the light emitting element that is being applied with the reverse bias voltage so as to apply a driving current to the light emitting element, and wherein the light emitting element is a laser diode having an anode and a cathode, the reverse bias circuit comprises:

a bias diode having a cathode that is directly connected to the anode of the laser diode, the bias diode having an anode that is directly connected to the cathode of the laser diode;

a resistance that is connected to the bias diode; and a first voltage supply that applies the reverse bias voltage to the light emitting element through the resistance, the first voltage supply applying a second forward bias voltage to the bias diode through the resistance, and the forward bias circuit comprises:

a second voltage supply that is directly connected to the anode of the laser diode and the cathode of the bias diode, the second voltage supply applying the first forward bias voltage to the laser diode;

a transistor having a base, an emitter and a collector, the collector being connected to the cathode of the laser diode and the anode of the bias diode;

a constant current source that is connected to the emitter of the transistor; and a control signal source that is connected to the base of the transistor.

12. The optical pulse tester according to claim 11, wherein the reverse bias circuit comprises:

a switch that selectively discontinues application of the reverse bias voltage to the light emitting element.

* * * * *